US008622561B2

(12) United States Patent
Carmody

(10) Patent No.: US 8,622,561 B2
(45) Date of Patent: Jan. 7, 2014

(54) COVERT SECURITY CAMERA WITHIN A LIGHTING FIXTURE

(76) Inventor: Michael Patrick Carmody, Peoria, AZ (US)

( * ) Notice: Subject to any disclaimer, the term of this patent is extended or adjusted under 35 U.S.C. 154(b) by 119 days.

(21) Appl. No.: 13/279,265

(22) Filed: Oct. 22, 2011

(65) Prior Publication Data

US 2012/0113646 A1 May 10, 2012

Related U.S. Application Data

(60) Provisional application No. 61/410,873, filed on Nov. 6, 2010.

(51) Int. Cl.
*G03B 15/02* (2006.01)

(52) U.S. Cl.
USPC ........ 362/8; 362/3; 362/5; 362/253; 362/362; 396/427; 396/433

(58) Field of Classification Search
USPC .......... 362/3, 5, 8, 85, 253, 362; 396/89, 106, 396/427, 433
See application file for complete search history.

(56) References Cited

U.S. PATENT DOCUMENTS 6,354,749 B1 * 3/2002 Pfaffenberger, II ........... 396/427
2007/0192910 A1 * 8/2007 Vu et al. .......................... 901/17

* cited by examiner

*Primary Examiner* — Stephen F Husar
*Assistant Examiner* — Meghan Dunwiddie
(74) *Attorney, Agent, or Firm* — Gary W. Malhoit

(57) ABSTRACT

A luminaire (100) includes a lamp housing (2) having an outer surface (42), and a cover (14) extends a height (1) above the outer surface (42). A camera (12) is concealed within the cover (14).

6 Claims, 4 Drawing Sheets

COVERT SECURITY CAMERA WITHIN A LIGHTING FIXTURE

This non-provisional application claims the benefit of a prior-filed provisional application having the application number of 61/410,873.

BACKGROUND OF THE INVENTION

The present invention relates, in general, to surveillance and, more particularly, to covert surveillance using a camera.

Although there is an overwhelming view that night lighting reduces crime, crime data does not support reduced crime rates with increased lighting. Since criminals need to see what they are doing, crime usually occurs in lighted areas. Hence, the majority of criminal activity occurs either in the daylight hours or in a region adjacent to artificial lights such as street lights.

Typically, street lights are frequently individually controlled to turn on and off by using electronic light sensitive devices that detect daylight. In order to provide sufficient exposure to daylight, the light sensitive device is generally contained within a protrusion or a distinct structure extending out from a housing of the street light lamp fixture. This extended structure can be positioned above, below and to the side of the lamp housing. Since criminals normally seek remote lighted spaces with limited or no surveillance to perform illegal activities, areas adjacent to street lights can be an excellent venue for performing surveillance. Thus, surveillance using a hidden security camera can provide a strong advantage for better capturing criminal activity including vandalism, stealing, illegal drug sales and the like.

Hence, there is a need to observe unfettered criminal activity by improving the stealth of security cameras in areas lit by street lights.

SUMMARY OF THE INVENTION

In one general aspect of the invention, a luminaire includes a housing having an outer surface and a cover extending a height above the outer surface and a camera is concealed within the cover.

In another general aspect of the invention, a luminaire includes a housing made of first and second portions having respective first and second outer surfaces. The first outer surface extends a height substantially above the second outer surface. The camera is concealed within the first portion.

In yet another general aspect of the invention, a luminaire includes a housing having first and second portions with respective first and second outer surfaces. The first surface extends a height substantially above the second surface. A privacy film is disposed on the first surface. A camera is concealed within the first portion.

DETAILED DESCRIPTION OF THE DRAWINGS

Generally, this invention is a light fixture or luminaire positioned on a pole or other structure and contains a concealed camera. The luminaire further includes components that allow fitting the concealed camera within a protrusion or cover extending above a surface of a housing of any of a possibility of street light housing configurations. The cover is made to conceal the camera. In one embodiment, the camera receives images through the cover and rotates independently with respect to the non-rotating cover. In yet another embodiment, the camera receives images through a hole in the cover and rotates in unison with the rotating cover. The cover resembles structures commonly used on street lights including structures that extend from the lamp housing for containing a sensor to turn on and off a street light at night and day times, respectively. The camera can include commercially available surveillance cameras having the capability to pan, tilt and zoom (PTZ) to track a target. These cameras are referred to as PTZ cameras and can have the capability of working in combination with thermal, audio and motion sensors to track changes within the camera's field of view. Further yet, the luminaire can be connected to the internet and controlled from a remote location using a controller.

Figure 1:
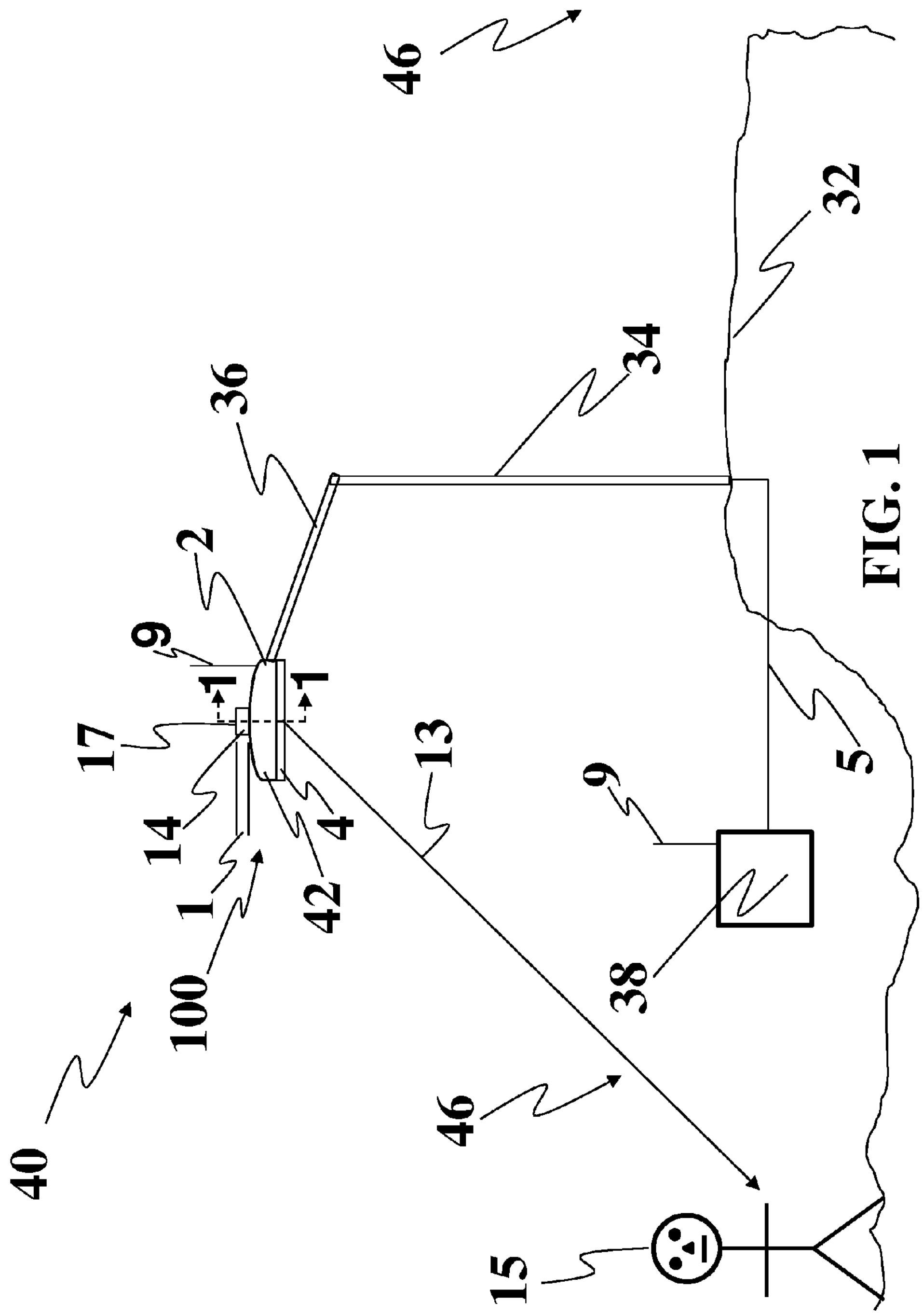
FIG. 1 is a side-view of a street lamp including a luminaire.

The present invention will be better understood from a reading of the following detailed description, taken in conjunction, with the accompanying drawing figures, in which like reference numbers designate like elements and in which:

FIG. 1 is a side-view depicting a street light 40 commonly used along traffic ways and other places. The street light 40 includes a pole 34 supported from the ground 32. Further, the street light 40 can include a cross-member 36, which can extend outward or laterally from the pole 34 and supports a lighting fixture or luminaire 100. The luminaire 100 can also be installed on any power/telephone or a roadway pole or any man-made structure or natural feature having access to electrical power. This includes the power grid or a battery, a generator, a solar panel and the like. The luminaire 100 can be retrofitted and made to function at most any location or roadway that includes light providing structures manufactured and used in most cities around the world. The luminaire 100 should not be considered limited to the particular application as shown in FIG. 1. The luminaire 100 includes a first portion or a lamp housing 2 having an outer surface 42 and internal components such as an electrical transformer (not shown) for stepping up or down the voltage. Typically, larger lamps require a transformer having more capacity and size and normally require more space within the lamp housing 2. Network conductors can be used for connecting to a computer network such as Ethernet or control cables 5 can be routed to the luminaire 100 through the pole 34 and cross-member 36.

FIG. 1 shows the outer surface 42 of the lamp housing 2. As depicted in FIG. 1, a portion of the outer surface 42 is curved. The lamp housing 2 can include a plurality of other shapes. The shape of the lamp housing 2 should not be considered a limitation of the present invention. The lamp housing 2 can be made using opaque materials including aluminum, galvanized steel and the like. Further, illustrated in FIG. 1 is a second portion of the luminaire 100 referred to as a protrusion or cover 14, which abruptly extends outward or above the outer surface 42. A top portion or top 17 of the cover 14 can extend a height 1 above the outer surface 42 over a range from about 2 inches to about 6 inches. The height 1 that the cover 14 extends above the outer surface 42 should not be considered a limitation of the present invention. The cover 14 is shown on a portion of the outer surface 42 opposite the ground 32. However, the location of the cover 14 can be any location on the outer surface 42. The location of the cover 14 should not be considered limited in relation to any particular location on the outer surface 42. It should be noted that the cover 14 can take on a variety of difference forms, shapes and is not limited. The cover 14 is substantially made to appear as a common feature of a street light 40 to provide a measure of stealth. Further, objects within the cover 14 are provided substantial concealment, thereby not causing attention to criminals and others. The cover 14 is generally made of opaque materials similar to the lamp housing 2.

In FIG. 1, a lamp or light source 4 is shown positioned on the bottom of the lamp housing 2. The light source 4 provides illumination for a region 46 in the vicinity of the street light 40. Obviously, illumination from the light source 4 can potentially propagate over a region extending to infinity, even into outer space. Here, the region 46 is limited and is defined within a radial distance 13, as illustrated in FIG. 1 of up to about 350 feet from the luminaire 100 as shown. In addition to the light source 4 providing luminosity to the region 46, illumination of region 46 can also occur from other ambient sources of light such as other street lights.

Figure 2:
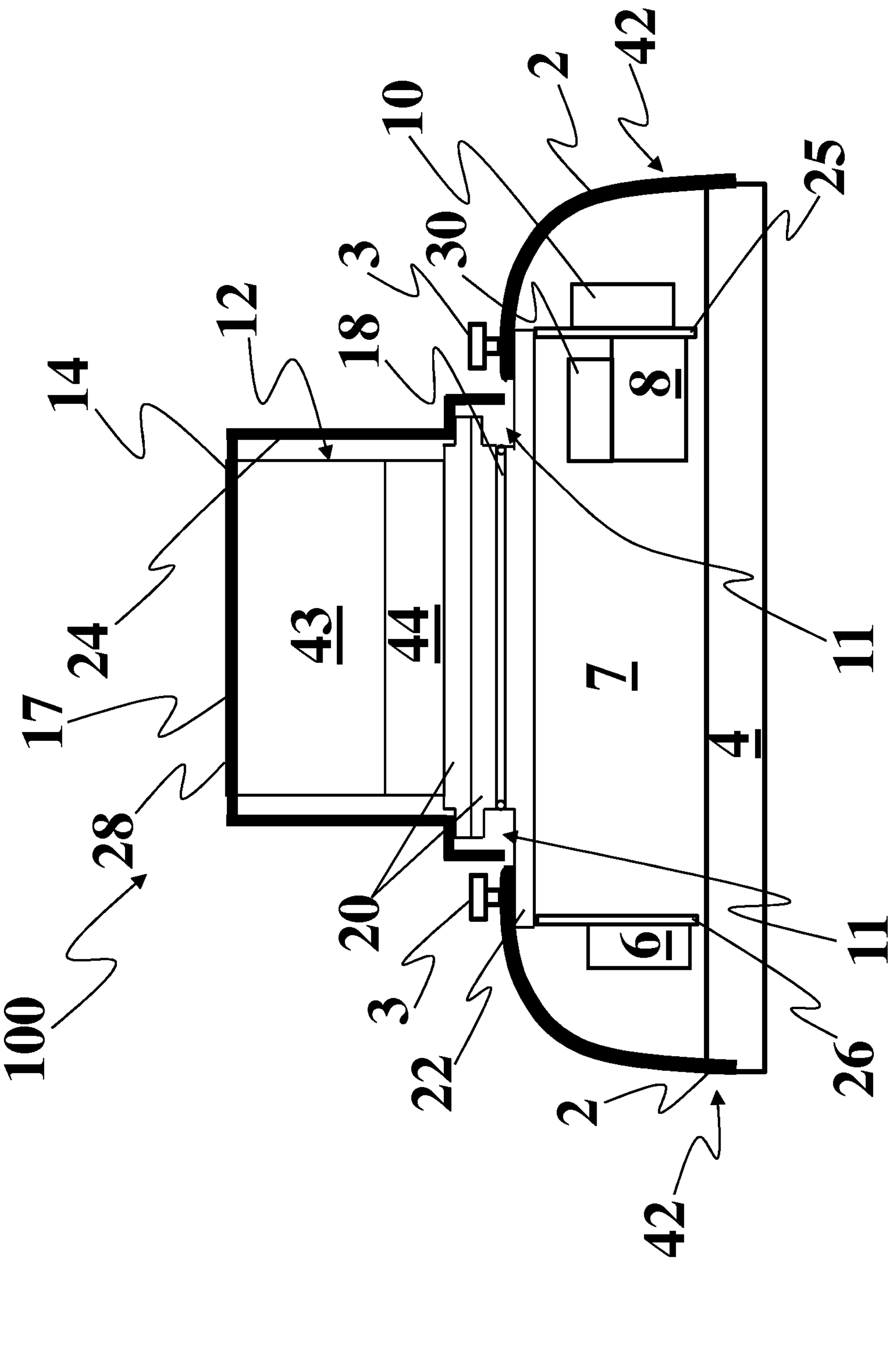
FIG. 2 is a cross-sectional view of the side of the luminaire of FIG. 1 having a camera that rotates in unison with a cover.

FIG. 2 is a cross-sectional view 1-1 taken from FIG. 1 illustrating the various components within the luminaire 100. An opening 11 is shown formed on the top of the lamp housing 2. As depicted in FIG. 2, a camera mounting bracket 22 is positioned across the opening 11 and is connected to the lamp housing 2 via fasteners 3. A seal 18 is shown disposed on and above the camera mounting bracket 22 and precludes water or moisture from entering a space or cavity 7 within the lamp housing 2. The seal 18 can be made using a felt material or various other materials including rubber, plastics and the like. A bearing 20 is depicted disposed on and above the seal 18. As illustrated in FIG. 2, the bearing 20 includes two portions referred to as upper and lower. These upper and lower portions of the bearing 20 are connected to the cover 14 and mounting bracket 22, respectively.

In FIG. 2, the camera 12 is illustrated disposed within the cover 14 of the luminaire 100 and includes a fixed base 44 and a rotatable viewer upper portion 43 for collecting visual images. The fixed base portion 44 of the camera 12 is shown connected to the upper portion of the bearing 20. The rotatable viewer upper portion 43 of the camera 12 can be connected to the top portion 17 of the cover 14. Hence, the camera 12 pans or rotates in synchronization the cover 14. For example, the camera 12 can rotate over an azimuth having a range of about 240 degrees to about 360 degrees. The cover 14 can include a variety of different cameras having varying capability including Internet Protocol. This invention should not be considered limited to any particular camera. Generally, the camera 12 can include a variety of cameras that pan, tilt and zoom and are referred to as PZT cameras. Further, the camera 12 can include video cameras used for the purpose of observing the region 46 (see FIG. 1) around the luminaire 100. A target 15 (see FIG. 1) can be tracked within a radial distance 13 (FIG. 1) of up to about 350 feet. For example, the target 15 (see FIG. 1) tracked by the camera 12 can include criminal activity, security, animal activity and the like. The tracking of the camera 12 is generally controlled by a controller 38 (see FIG. 1). Further, the controller 38 can use a wireless router with Broadband, DSL and Wi-Fi™ and can be connected to a recording device for recording the target 15. The controller 38 can be coupled to communicate to the camera 12 either through the cable 5 or via antennas 9 (FIG. 1) using electromagnetic waves. The information from the camera 12 can be collected into a database and used in combination with software to automate searching. Further yet, the camera 12 can include encryption capabilities and can include day/night functions for turning on adjacent electrical loads such as the light source 4. PZT cameras generally include the capability to track up and down or tilt over a range from about minus 35 degrees to about 45 degrees. Depending on the particular configuration of the luminaire 100, the utilization of the camera's 12 tilt capability can vary. Further, depending on the particular camera 12, the zoom capability can vary over a range from about 20×to about 40×. The camera 12 can be connected directly to the Ethernet or control/power cable 5 (FIG. 1) and controlled from any location having Ethernet capability. Further yet, the luminaire 100 can include a battery backup (not shown) for the camera 12 and the light source 4 in the event electrical power is interrupted.

The cover 14, as depicted in FIG. 2, extends from the lamp housing 2 and is connected to the upper portion of the bearing 20. The cover 14 is also shown connected to the viewer upper portion 43 of the camera 12 and rotates with the camera 12. Since bearing 20 is connected to the cover 14 and the mounting bracket 22, which is connected to the lamp housing 2, the cover 14 is said to be indirectly connected to the lamp housing 2. As shown in FIG. 2, the cover 14 includes inner 24 and outer 28 surfaces.

As shown in FIG. 2, a bracket 26 is connected to the lamp housing 2 and extends below the camera mounting bracket 22 into the cavity 7 within the lamp housing 2. The bracket 26 can be used to secure a cooling fan 6 within the cavity 7. As depicted in FIG. 2, a bracket 25 can be connected to and extends below the camera mounting bracket 22 and can be used to support a power supply 8, a dusk-to-dawn sensor 30, a router 10, switches (not shown) and circuit breakers (not shown) within the cavity 7. In another embodiment, the camera 12 can replace the dusk-to-dawn sensor 30 and be used to turn the light source 4 on or off in concert with the daily solar-cycle.

Though FIG. 2 depicts a particular configuration of the camera 12 and the lamp housing 2, the size and shape of the lamp housing 2 can vary substantially. Hence, the cavity 7 within the lamp housing 2 can vary. For example, in one embodiment the cavity 7 can enclose a volume of about 10 inches by about 6 inches by about 6 inches. In another embodiment, the cavity 7 can be larger. For this reason, the details concerning the configuration such as the number and shape of brackets (e.g., brackets 25 and 26) can vary. This luminaire 100 should not be limited to any particular the size and shape, because the lamp housing 2 and camera 12 can vary substantially.

Figure 3:
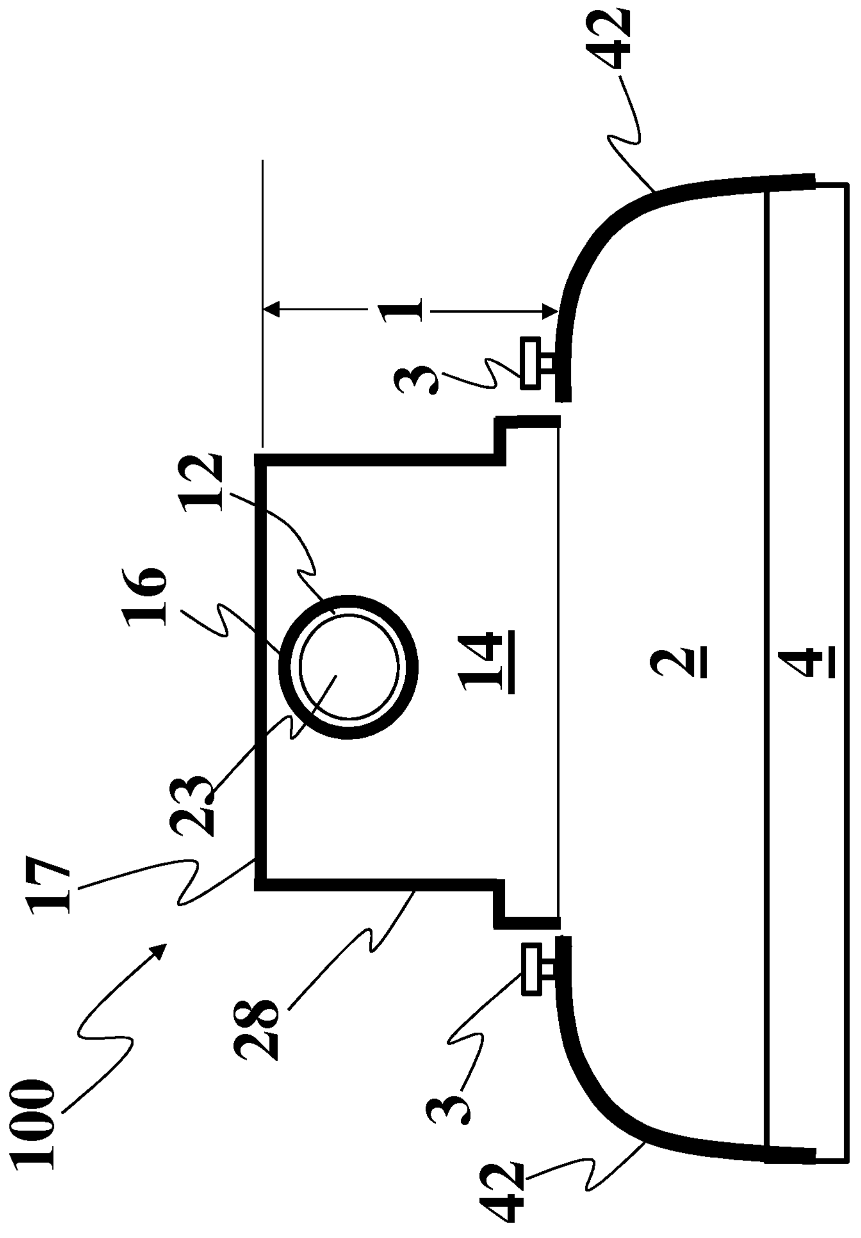
FIG. 3 is a side-view of the luminaire.

FIG. 3 is a side-view of the luminaire 100 illustrating an opening 16 of the cover 14 for the camera 12 to receive images from within at least the region 46 (See FIG. 1). The top 17 of the cover 14 extends the height 1 above the outer surface 42 of the lamp housing 2. The opening 16 is depicted in FIG. 3 around a camera opening 23 and provides concealment and protection for the camera 12. The alignment of the openings 16, 23 of the cover 14 and camera 12, respectively, provides concealment of the camera 12. In other words, the camera 12 is aligned with the opening 16 of the cover 14. In one embodiment, the opening 16 of the cover 14 is about 2 inches in diameter. The opening 16 of the cover 14 should not be considered limited to any particular size and shape. In another embodiment (not shown) the opening can be shaped as an oval. Or yet in another embodiment (not shown), the opening can be shaped as a square.

In FIG. 3, the relationship between the sizes of the cover 14 and the lamp housing 2 are generally not accurately depicted. One measure of the actual relationship in the size between the cover 14 and the lamp housing 2 can include the volume and the area of the outer surface of each. Generally, the ratio is based on the area of the outer surfaces (e.g., outer surface 28 for cover 14 and outer surface 42 of lamp housing). This ratio of the outer surfaces of the lamp housing 2 and the cover 14 can range from about 10 to 1 to about 27 to 1. In other words, the cover 14 is substantially smaller than the lamp housing 2, thereby the cover 14 is much less noticeable than the lamp housing 2. Hence, a camera 12 within the cover 14 can be said to be concealed based on the relative size difference of the cover 14 and the lamp housing 2. With the luminaire mounted a significant distance (e.g., 10 feet to 40 feet) above the surface or ground, the concealment of the camera 12 can be substantial.

Figure 4:
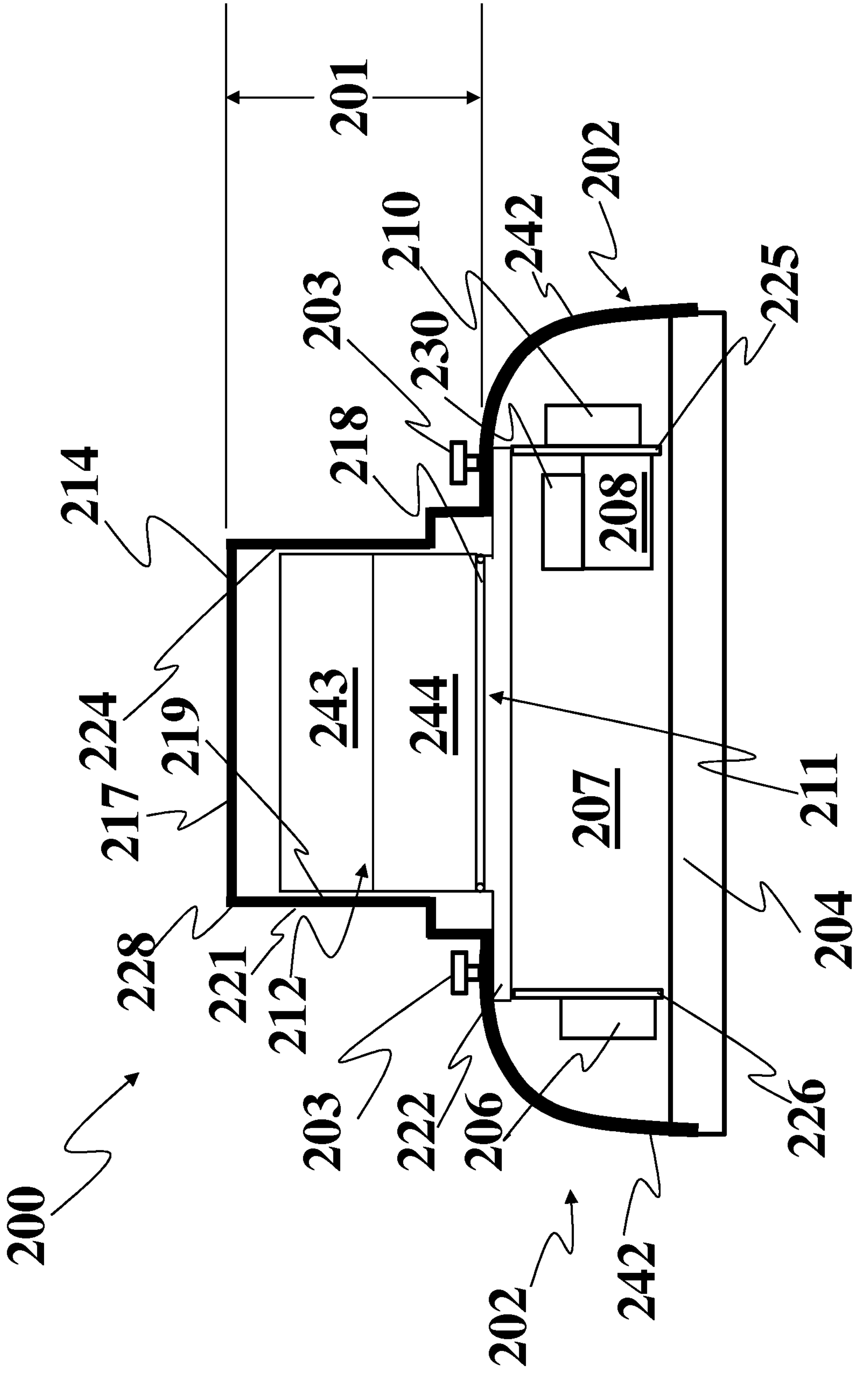
FIG. 4 is a cross-sectional view of the side of a luminaire having a camera that independently rotates with respect to a cover.

FIG. 4 is a cross-sectional view of a light fixture or luminaire 200. FIG. 4 illustrates the various components within the luminaire 200 including an opening 211 that is formed on the top of a lamp housing 202. A camera mounting bracket 222 is positioned over the opening 211 and is connected to the lamp housing 202 via fasteners 203. A seal 218 is disposed on and above the camera mounting bracket 222 and precludes water or moisture from entering a space or cavity 207 within the lamp housing 202. The seal 218 can be made using a felt material or various other materials including rubber, various plastics and the like.

A cover 214, as depicted in FIG. 4, extends from an outer surface 242 and is said to be directly connected to lamp housing 202 and is shown disposed over a camera 212, which rotates within the cover 214. More particularly, the camera 212 is disposed within the cover 214 of the luminaire 200 and includes a fixed base portion 244 and a rotatable viewer upper portion 243 for collecting visual images. A top portion 217 of the cover 214 extends a height 201 above the outer surface 242 and can be made of various translucent materials such as a variety of plastics that have been further processed to include a tint or an applied film.

As shown in FIG. 4, a bracket 226 is connected to and extends below the camera mounting bracket 222 into the cavity 207 within the lamp housing 202. The bracket 226 can be used to secure a cooling fan 206 within the cavity 207. As depicted in FIG. 4, a bracket 225 can be connected to and extends below the camera mounting bracket 222 and can be used to support a power supply 208, a dusk-to-dawn sensor 230, a router 210, switches (not shown) and circuit breakers (not shown) within the cavity 207. A light source 204 is depicted at the bottom of the lamp housing 202.

A privacy film can reduce the visibility within at least the visible portion of the electromagnetic spectrum through generally transparent materials. The privacy film can be silvered, thereby offering an unimpeded view from the low-light side but virtually no view from the high-light side. The privacy film can be made by frosting transparent materials. This can transform the material to translucent. There are a number of privacy film gradients that can be lighter or darker. Further, the privacy film can include material having a plurality of small holes referred to a perforated film. Here, we refer to the variety of privacy films generally as a tint, silvered, mirrored or a perforated film and the like.

A tint 219 is disposed on the cover 214 meaning the tint 219 can be on the inner surface 224 or outer surface 228 or diffused within the cover 214 material. As depicted in FIG. 4, the tint 219 is disposed on the inner surface 224. By tinting the cover 214, the camera 212 can be concealed. In another embodiment, a perforated film 221 is shown disposed on the outer surface 228 of the cover 214. The perforated film 221 can include films such as 3M™ Scotchcal™.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What I claim is:

1. A luminaire, comprising:

a lamp housing containing a lamp for illuminating a region;

a cover connected to and above the lamp housing, wherein the cover is selected from a group of covers comprising a tint disposed on the cover and a perforated film disposed on the cover; and a camera concealed within the cover, wherein the camera tilts, zooms, pans and rotates on an azimuth in unison with the cover or independently rotates on an azimuth with respect to the cover.

2. The luminaire of claim 1, further comprising an opening on the cover.

3. The luminaire of claim 2, wherein the camera is aligned with the opening of the cover.

4. The luminaire of claim 1, wherein the cover is directly connected to the lamp housing.

5. The luminaire of claim 1, wherein the cover is indirectly connected to the lamp housing.

6. A luminaire, comprising:

an upper portion;

a lower portion connected to the upper portion and containing a lamp for illuminating a region, wherein the upper portions, is made of a material selected from a group of materials including tinted, translucent and opaque, and wherein the lower portion is substantially larger than the upper portion; and a camera concealed within the upper portion and controlled by a controller for tracking a target and rotates on an azimuth a complete 360 degrees.

* * * * *